March 24, 1964
J. V. OLIVEAU
3,125,880
PITOT TUBE ASSEMBLY
Filed Aug. 17, 1960
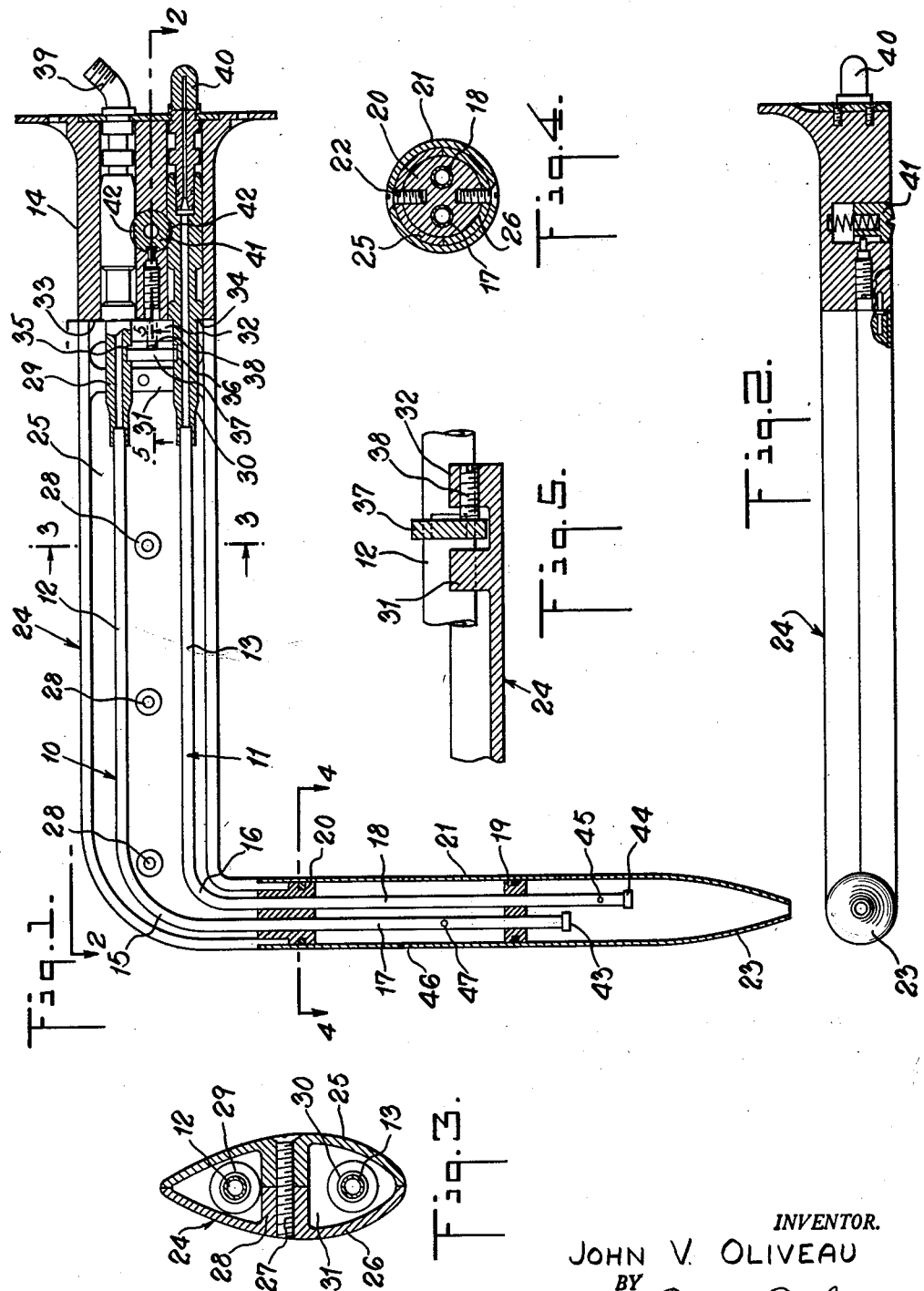
INVENTOR.
JOHN V. OLIVEAU
BY
Benj. T. Rauber
ATTORNEY

# United States Patent Office 3,125,880
Patented Mar. 24, 1964

3,125,880
PITOT TUBE ASSEMBLY
John V. Oliveau, Greenwich, Conn., assignor to Aerotec Industries, Inc., Greenwich, Conn., a corporation of Connecticut
Filed Aug. 17, 1960, Ser. No. 50,236
4 Claims. (Cl. 73—212)

My invention relates to a Pitot tube assembly, particularly for use on aircraft.

Pitot tubes are used on airplanes to determine the dynamic pressure of the air stream of the air flowing relatively to the airplane and the free static pressure of the air at the altitude of the plane. These pressures or their relative values are used to obtain measurements or data relating to the flight.

An assembly of tubes, two for example, are mounted on a bracket fixed to a part of the plane and extend outwardly from the bracket and thence forwardly. To support the tubes and protect them from stresses resulting from the flow of the air they are enclosed and supported in a housing. The assembly of tubes and housing is detachably secured to the bracket for the purpose of replacement and repair, the inner ends of the tubes when secured in the bracket fitting into tubes or passages leading to measuring or recording means.

Heretofore Pitot tube assemblies of this type were fabricated of cuprous alloys which enabled the tubes to be joined to the enclosing housing with low temperature solders and to accomplish numerous blind joints required in the assembly. This construction had the disadvantage of excessive weight and of an extremely low strength-weight factor. The use of metallic alloys of lower density, such as aluminum or aluminum alloys, in the construction used proved impractical because of difficulties in brazing these low density alloys.

My invention provides a Pitot tube assembly the construction of which permits the use of low density alloys without the necessity of brazing or soldering. It also permits the use of other, stronger, metals where strength is particularly desirable.

In the construction of my invention, a pair of tubes are arranged in spaced, side by side, position, and extending outwardly from a supporting bracket in supporting lengths then bent to extend forwardly in a free length. These tubes may be made of thin wall stainless steel. The free lengths extending forwardly from the bent portions of the tubes are enclosed in a shell of aluminum alloy which extends forwardly beyond the free ends of the tubes and is preferably contracted or tapered forwardly of the ends of the tubes. The tubes are held in spaced position by a pair of spaced bushings to which they are brazed and which fit the inner surface of the shell. The shell is secured to the bushings by screws and sealed thereto by O rings or other sealing means to form an air tight enclosure between the bushings.

The supporting parts of the tubes at the bends are enclosed in and supported by a housing of two complementary parts or halves extending from the supporting bracket about the bends of the tubes and forwardly to be overlapped by the rear end of the shell. Preferably the forward ends of the housing parts are secured between the rear bushing and the shell. The two halves or parts of the housing are secured together by screws or similar means. The tubes are held in position at the end of the housing abutting the supporting bracket by a partition or partitions in the housing. The ends of the tubes projecting from the supported end of the housing are enlarged to form shoulders abutting the partition and are notched inwardly of the partition to receive a plate. A screw through the partition and bearing against the plate serves to draw and tighten the shoulders of the tubes against the partition. The ends of the tubes projecting from the housing are received and locked in the supporting bracket.

The various features of my invention are illustrated by way of example in the accompanying drawings, in which:

FIG. 1 is a horizontal section of a Pitot tube assembly embodying a preferred form of the invention;

FIG. 2 is an elevation of the assembly taken from the forward end of the tubes and in section on the line 2—2 of FIG. 1;

FIG. 3 is a vertical section on line 3—3 of FIG. 1;

FIG. 4 is a vertical section on line 4—4 of FIG. 1;

FIG. 5 is a section on a larger scale of a detail of the Pitot tube taken on line 5—5 of FIG. 1.

In the embodiment of the invention shown in the drawing the assembly comprises a pair of tubes 10 and 11 placed in side by side position and spaced. Each tube comprises a supporting length 12 and 13, respectively, extending from a supporting bracket 14 to a bend 15 and 16, respectively, and thence forwardly in free lengths 17 and 18, respectively. The length 18 extends forwardly beyond the end of the length 17. The lengths 17 and 18 extend through and are brazed in openings in a forward bushing 19 and a rear bushing 20. This brazing is done before these lengths are enclosed in a shell 21. The shell 21 is then slipped over the assembled bushings and tubes with a close or tight fit and is secured to the rear bushing by means of screws 22, FIG. 4. The forward end of the shell is drawn inwardly or tapered as at 23 beyond the ends of the tubes.

The supporting lengths 12 and 13 and the bends 15 and 16 are enclosed in a housing 24 of two complementary parts 25 and 26, the part 25 being the lower part and the part 26 the upper part. These parts are assembled with their edges in abutment about the lengths 12 and 13 and bends 15 and 16 and are secured together by screws 27 passing through inwardly extending threaded studs 28. The forward ends of the housing parts extend between the rear end of the shell and the bushing 20 and are secured by the screws 22. The rear or supported ends are secured in enlarged extensions 29 and 30 of the tubes 12 and 13 which are held in openings formed by recesses in a pair of partitions 31 and 32 at the supporting bracket 14. The extensions 29 and 30 extend beyond the end of the housing and partitions and are enlarged to form shoulders 33 and 34 abutting the partition 32. The extensions are also notched at 35 and 36 to receive a cross plate 37. A screw 38 threaded through the partition 32 is tightened against the plate 37 to draw the extensions shoulders tightly against the partition 32, thus holding the tubes 12 and 13 securely against longitudinal displacement. The housing is preferably of stream lined or airfoil shape to minimize wind resistance and provide greater rigidity and strength against the dynamic pressure of the air stream.

The supporting bracket may be of known construction having passages to receive the extensions 29 and 30 of the tubes 10 and 11 and connectors 39 and 40 to fit air tightly into the ends of the extensions 29 and 30 and a sliding locking bolt 41 to move into engagement with opposite complementary recesses 42 in the extensions 29 and 30 of the tubes 10 and 11 to hold the tube assembly firmly to the bracket.

The free ends of the tube lengths 17 and 18 are capped by caps 43 and 44 and the tube length 18 is provided with an opening 45 to admit the free stream dynamic pressure built up in the forward part of the shell 23. The shell is provided with an opening 46 to admit free stream static pressure into the enclosure in the shell between the bushings 19 and 20 and the tube length 17 is provided with an opening 47 to admit this pressure into the tube 10.

Through the above invention a choice of materials of construction is afforded. The tubes 10 and 11 may be made of stainless steel for strength and resistance to corrosion, the weight of these tubes being slight. The supporting shell and housing may be made of light weight aluminum alloy to provide a maximum strength for a minimum weight. No difficult brazing or soldering operations are required and the danger of faulty brazing or soldering is obviated.

Having described my invention I claim:

1. A Pitot tube assembly for determining dynamic and static pressures of an air stream which comprises a pair of tubes each tube being bent to provide a support length at one end of said bend and a free length at the other end of the bend transverse to said support length, said tubes being in a common plane spaced side by side, a shell enclosing said free lengths and extending beyond the free ends thereof, a pair of bushings in said shell spaced lengthwise of said lengths of tubes therein and sealed to said lengths and to said shell to hold said lengths rigidly in position, a housing enclosing said support lengths and said bends and overlapped by the adjacent end of said shell, said housing comprising two complementary parts joined at the plane of said support lengths of said tubes and having complementary partition elements near the ends of said lengths to engage said tube lengths and hold them in position, and means to hold said housing parts together and in which one of said tubes is open to the interior of said shell in advance of said bushings and the other tube is open to the space in said shell between said bushings and said space is open to the outside of said shell.

2. The Pitot tube assembly of claim 1 in which said means to hold said assembled housing parts together comprises screws threaded through one part of said housing and into the complementary part of the other of said housings and in which an end of said housing is inserted between one of said bushings and said shell.

3. The Pitot tube of claim 1 in which at least one of said partition parts of said housing is divided to form a space transverse to said tubes and in which each of said tubes has an opposed notch in said space and has shoulders abutting the outer face of said partition parts and in which said assembly comprises a transverse plate in said space and extending into said opposed notches and a screw threaded through one of said partition parts into abutment with said plate to hold said shoulders against said partition parts.

4. The Pitot tube assembly of claim 1 in which said tubes extend through said housing and in which each tube has a notch opposed to the notch of the other tube and which comprises a bracket having openings to receive the ends of said tubes and a locking member slidable to a position in said notches to lock said tubes in said bracket.

References Cited in the file of this patent

UNITED STATES PATENTS

| | | |
|---|---|---|
| 2,300,654 | Daiber | Nov. 3, 1942 |
| 2,325,018 | Moss | July 20, 1943 |
| 2,381,327 | Woodman et al. | Aug. 7, 1945 |
| 2,650,497 | Renwanz | Sept. 1, 1953 |